United States Patent [19]
Galey et al.

[11] 3,868,987
[45] Mar. 4, 1975

[54] METHOD OF ELECTRIC REFINING OF METALS BY SLAG, KNOWN AS THE E. S. R. METHOD, USING LIQUEFIED GAS TO ISOLATE THE SLAG AND ELECTRODE FROM THE AMBIENT AIR

[75] Inventors: Jean G. Galey, Voisins Bretonneux; Gerard Bentz, Elancourt-Trappes, both of France

[73] Assignee: L'Air Liquide-Societe Anonyme Pour L'Etude et L'Exploitation Des Procedes Georges Claude, Paris, France

[22] Filed: Feb. 12, 1973

[21] Appl. No.: 331,376

[30] Foreign Application Priority Data
Feb. 24, 1972 France .................. 72.06204

[52] U.S. Cl. .................. 164/52, 75/10 C, 75/96, 164/56
[51] Int. Cl. .................. B22d 27/02
[58] Field of Search .......... 75/10 C, 24, 96; 164/56, 164/52

[56] References Cited
UNITED STATES PATENTS

| 3,034,888 | 5/1962 | Lefever | 75/96 X |
| 3,063,828 | 11/1962 | Booth, Jr. et al. | 75/96 X |
| 3,565,602 | 2/1971 | Konisi et al. | 75/10 |
| 3,687,187 | 8/1972 | Tommaney et al. | 75/10 X |
| 3,689,048 | 9/1972 | Foulard et al. | 75/96 X |
| 3,764,305 | 10/1973 | Andersson | 75/96 X |

FOREIGN PATENTS OR APPLICATIONS

| 987,190 | 3/1965 | Great Britain | 164/56 |
| 41-23 | 5/1965 | Japan | 75/10 |
| 560,260 | 7/1958 | Canada | 75/10 |
| 657,716 | 2/1963 | Canada | 75/10 |
| 1,175,453 | 12/1969 | Great Britain | 75/10 |

*Primary Examiner*—Robert V. Hines
*Assistant Examiner*—Thomas A. Waltz
*Attorney, Agent, or Firm*—Young & Thompson

[57] ABSTRACT

High purity metal is produced by electro-slag refining by passing an electric current through a consumable electrode of the material to be refined, then through an electrically conductive slag to a body of the molten metal atop an upwardly growing water-cooled ingot. The lower end of the electrode and the surface of the slag are protected by a layer of liquefied gas substantially inert to the electrode, e.g. argon or nitrogen, the vaporized gas passing off to the atmosphere after a portion thereof is directed against an upper portion of the electrode.

2 Claims, 2 Drawing Figures

PATENTED MAR 4 1975

3,868,987

METHOD OF ELECTRIC REFINING OF METALS BY SLAG, KNOWN AS THE E. S. R. METHOD, USING LIQUEFIED GAS TO ISOLATE THE SLAG AND ELECTRODE FROM THE AMBIENT AIR

The present invention relates to an improvement in the process of electric refining by slag, in which an electric current is passed between a consumable electrode of a metal to be refined and a mass of the same metal after refining, through a layer of molten slag which is a conductor of electricity when hot.

In the known process in question, generally known as the "E.S.R. process" the electrode heated by the slag which is in turn heated by the passage of the electric current, gradually melts in drops which pass through the slag and are subjected to its purifying action.

It has been found that the ambient air frequently acts on the slag, introducing into it especially oxygen and hydrogen, which elements are then transferred by the slag to the purified metal; this is particularly troublesome in the case of steels containing aluminium or titanium.

The improvement according to the invention overcomes this drawback. It is characterized by the fact that there is available on the upper face of the slag a layer of liquefied gas which is practically inert with respect to the metal. This layer and the vapours which it produces protect the slag from the ambient air and, to a certain extent, that which surmounts the slag is also protected. This protection may be completed by creating on the hot surface of the electrode emerging from the slag, a layer of liquefied gas which is practically inert with respect to the metal. As the liquefied gas, there may be utilized a rare gas, argon for example, or nitrogen if it does not risk having any undesirable action.

The figures of the accompanying drawing represent partly in cross-section, diagrammatically and by way of non-limitative examples, forms of embodiment of the improvement according to the invention.

Figure 1:
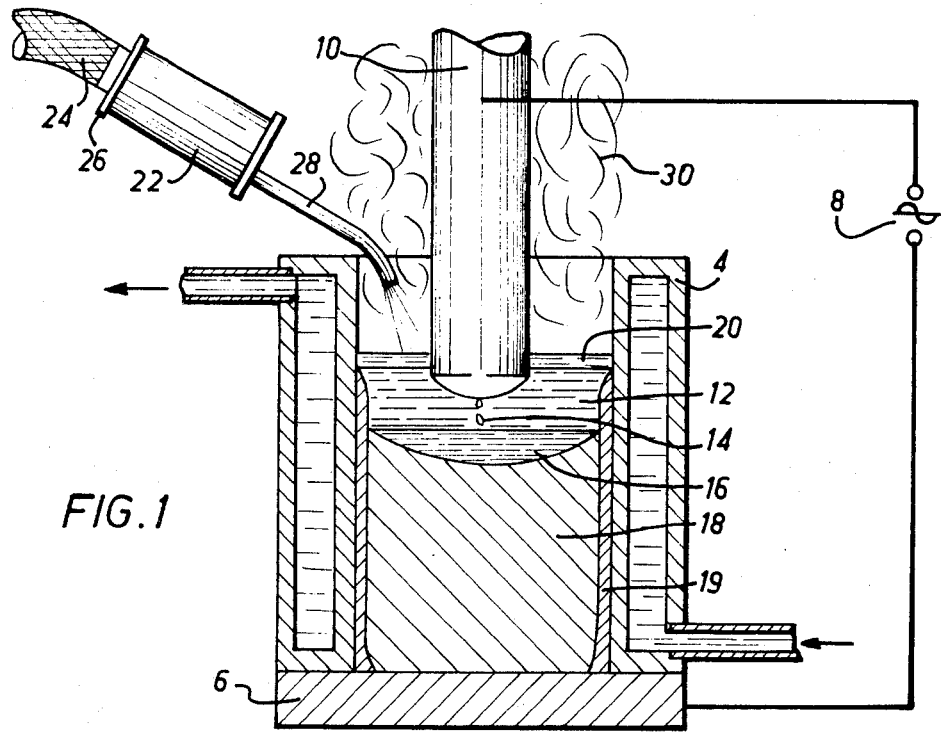
FIG. 1 shows a first form of embodiment.

In both cases, an ingot mould 4, cooled by water circulation, rests on a metal plate 6 connected to one terminal of a source 8 of direct or alternating current. The other terminal of this source is connected to an electrode 10, the lower extremity of which dips into molten slag 12 which has been introduced into the ingot mould. The slag which is a conductor of electricity in the molten state, is heated by the Joule effect of the current which passes from the electrode to the plate. When it has exceeded the melting temperature of the electrode, the latter melts at its lower extremity, forming drops such as 14 which fall and pass through the slag, being subjected to the refining action of this slag.

Below the layer of slag, the drops collect in a liquid bath 16 of refined metal. This bath becomes gradually solidified, forming an ingot 18 surrounded by a film 19 of solifidied slag. All this process is carried out in known methods of electric refining by means of slag.

In the case shown in FIG. 1, the molten slag is surmounted by a layer 20 of liquefied inert gas. This liquid comes from a separator 22 supplied with partly vaporized liquefied gas, through a flexible and heat-insulated conduit 24. From the separator, the vapours pass out through holes formed in its upper extremity 26, while the liquid passes out close to its lowest point and is led through a nozzle 28 above the layer of slag.

The layer 20 is a good protection for the slag, from which it is separated by a continuous layer of vapour due to the heating effect, which means that it only evaporates relatively slowly. The vapours produced at 30 protect the electrode from the ambient air to a certain extent. In addition, it is possible to lead the vapours coming from the separator into the space above the layer 20.

Figure 2:
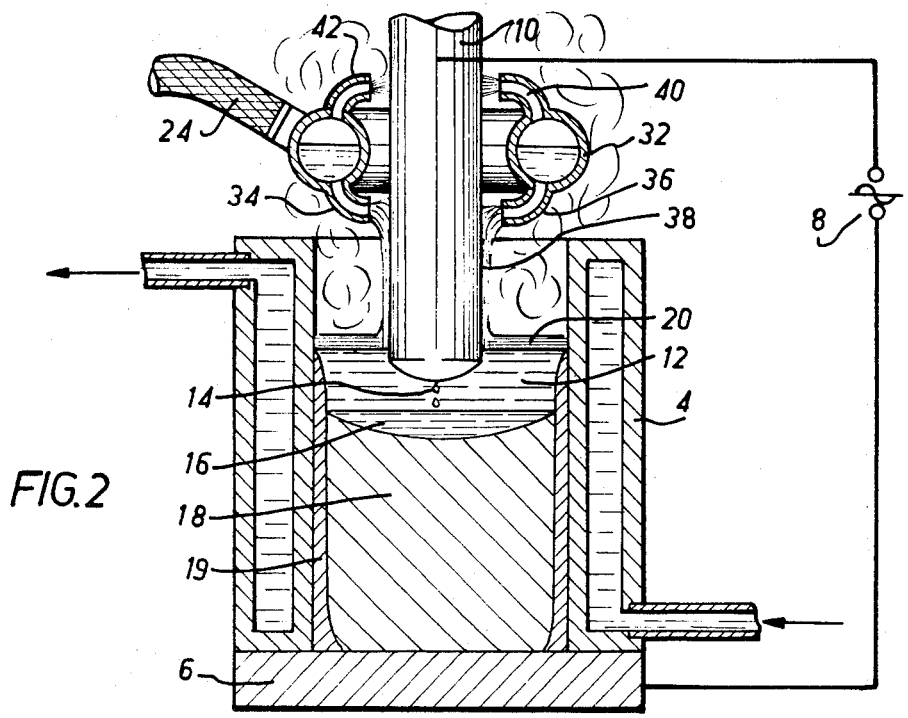
FIG. 2 represents an alternative form of FIG. 1, in which liquefied gas is poured on the electrode.

The protection of the electrode is still further improved in the case shown in FIG. 2. In this case, an annular separator 32 is utilized and is arranged round the electrode. From the lower part of this separator lead tubes such as 34 and 36 which pour the liquid phase on to the electrode. There is thus formed on the hottest portion of the electrode, a protective film 38 which flows while being somewhat vaporized with the action of heat, and causes the formation of the layer 20 over the slag. It is obvious from FIG. 2 that the flow rate of liquified gas must be sufficient to form said liquid layer on the slag Tubes such as 40 and 42 start from the upper portion of the separator and lead the vapour phase in the direction of the electrode.

The devices described may be modified without thereby departing from the scope of the present invention. For example, the separator 32 may be lowered and its tubes 34 and 36 may be modified so as to pour out the liquefied gas directly on the layer 20.

The improvements according to the invention can be utilized for the electric refining of various metals by the slag method: stainless steels, refractory steels, high-speed steels for tools, and all metals, ferrous or non-ferrous which it is possible to refine at atmospheric pressure by means of consumable electrode process.

What we claim is:

1. A method of producing a high purity metal by electro-slag refining at atmospheric pressure, comprising passing in electric current between a consumable electrode of the material to be refined and a mass of already refined metal through a molten and electrically conductive slag, and pouring a liquefied gas in liquid phase, which is substantially inert to said metal, downwardly along at least a lower part of the electrode to form a film over at least the lower part of the electrode which isolates said lower part of the electrode from the ambient air and then over the upper surface of the slag thereby to form a liquid layer on said slag from which it is separated by a continuous layer of vapor isolating said slag from the ambient air, the flow rate of said liquefied gas being sufficient to form said liquid layer.

2. A method as claimed in claim 1, and projecting vaporized gas from said liquefied gas onto said electrode above said liquid layer.

* * * * *